Patented Sept. 2, 1924.

1,507,181

UNITED STATES PATENT OFFICE.

NEVIL MONROE HOPKINS, OF NEW YORK, N. Y., ASSIGNOR TO THE BURNOT FIRE-PROOFING PRODUCTS, INC., A CORPORATION OF NEW YORK.

FIRE-RESISTING PAINT.

No Drawing. Application filed April 4, 1922, Serial No. 549,565. Renewed January 21, 1924.

*To all whom it may concern:*

Be it known that I, NEVIL MONROE HOPKINS, a citizen of the United States, and a resident of New York city, in the county of New York and State of New York, have invented certain new and useful Improvements in Fire-Resisting Paint, of which the following is a specification.

The present invention relates to novel methods of fireproofing combustible substances such as wood, mill-board, pasteboard, straw-board, and other porous or partially porous inflammable or combustible substances, through the agency of an externally applied coat of impregnating, or semi-impregnating, fire resisting water vehicle paint.

I find that a valuable combination, impregnating or semi-impregnating, and fire resisting water vehicle paint, may be cheaply and economically made by using a water solution of sodium silicate and sodium fluoride ground into a paint paste or cream of considerable hiding power by the addition of substances such as finely divided asbestos, asbestine a pure fibrous silicate of magnesia, kaolin and zinc oxide, or a mixture of such substances, colored by the addition of such pigments as French ocher, Venetian red, oxide of iron, lamp black, etc.

Although the proportions of the substances may be somewhat varied to meet different conditions, the following formula is typical of the best:

1.50 pints sodium silicate solution 41.6° Bé.
.50 pint water.
4 oz. sodium fluoride.
6 oz. asbestine.
6 oz. ground asbestos.
2 oz. of yellow ocher or any other pigment sufficient to color.

I find that a mixture of such substances when ground through a paint mill or other suitable device for intimate incorporation, produces a creamy paint like substance, which imparts a highly valuable fire resisting property to porous, or partially porous, combustible substances, as the surfaces of such substances mentioned by virtue of the porosity, cause them to act like a filter, admitting the water, together with the substances in true chemical solution, namely the sodium silicate and the sodium fluoride but arresting and confining to the surface the substances merely in mechanical suspension, the asbestos, asbestine, kaolin, zinc oxide and the coloring pigment, together with a certain superfluity of the binding sodium silicate.

Such a water vehicle paint strikes into the surface of the material to be protected, with the filter action as described, impregnating the substance to be fireproofed with a highly fire resisting substance or substances, and also covering the outer surface of the material to be fireproofed, with a layer of a substance or substances of fire resisting material and of low heat conducting value.

I find that a permanent, smooth and reliable "locked on" surface paint results from the impregnation, drying, setting and hardening of this combination of substances, both within the pores and upon the surface of the pores of the material to be protected, for interior work where it is not subject to the action of the elements.

By first treating the surface of a porous, or partially porous combustible substance, with the water paste paint or cream solution, consisting of the mixture of sodium silicate, sodium fluoride, asbestos, zinc oxide and kaolin, or any mixture of these substances, colored by any suitable pigment, I secure the fireproofing element, or a suitable combined fireproofing and decorative paint for indoor work.

I may, of course, elect to treat the surface of a combustible substance with one coat of the water ground solution and emulsion mixture as above described, or I may elect to apply one or more coats of the said water ground paint, and I may super-impose thereon one or more coats of standard linseed oil white lead paint or a specially proposed paint for the purpose, and I may in addition apply a coat or more of varnish, or I may elect to apply one or more coats of the water solution emulsion composition as hereinbefore described and elect to protect the same from the action of the elements with one or more coats of shellac. I may elect to leave the shellac finish or I may varnish, or paint on top of the shellac.

Having described my invention, I claim:

1. A fire resisting or fire retarding paint consisting of a water solution of sodium silicate, and sodium fluoride ground into a paint or paste with finely divided asbestos admixed with kaolin, zinc oxide and a coloring pigment.

2. The herein described new paint composition consistng of a water solution of sodium silicate in the proportions of one and one half pints; sodium fluoride one half pint; 6 ounces finely divided asbestos and 6 ounces asbestine admixed with sufficient kaolin, and zinc oxide to increase the hiding power of the paint and sufficient coloring matter to provide a predetermined color thereto.

Signed at New York city, in the county of New York and State of New York, this third day of April, A. D. 1922.

NEVIL MONROE HOPKINS.